United States Patent
Krishnababu

(10) Patent No.: US 10,552,555 B2
(45) Date of Patent: Feb. 4, 2020

(54) METHOD FOR THE PREDICTION OF TURBOMACHINE PERFORMANCES

(71) Applicant: Siemens Aktiengesellschaft, Munich (DE)

(72) Inventor: Senthil Krishnababu, Lincoln (GB)

(73) Assignee: Siemens Aktiengesellschaft, Munich (DE)

( * ) Notice: Subject to any disclaimer, the term of this patent is extended or adjusted under 35 U.S.C. 154(b) by 255 days.

(21) Appl. No.: 15/518,594

(22) PCT Filed: Oct. 19, 2015

(86) PCT No.: PCT/EP2015/074146
§ 371 (c)(1),
(2) Date: Apr. 12, 2017

(87) PCT Pub. No.: WO2016/066465
PCT Pub. Date: May 6, 2016

(65) Prior Publication Data
US 2017/0235863 A1 Aug. 17, 2017

(30) Foreign Application Priority Data
Oct. 31, 2014 (EP) .................................... 14191325

(51) Int. Cl.
*G06F 17/50* (2006.01)

(52) U.S. Cl.
CPC ...... *G06F 17/5009* (2013.01); *G06F 2217/16* (2013.01)

(58) Field of Classification Search
CPC ............. G06F 17/5009; G06F 2217/16; G05B 13/048
See application file for complete search history.

(56) References Cited

U.S. PATENT DOCUMENTS 7,941,300 B1 * 5/2011 Bowers ............... G06F 17/5018
703/1
8,061,988 B1 * 11/2011 Rawlings ............ G06F 17/5018
416/97 R
(Continued)

FOREIGN PATENT DOCUMENTS

CN 101418813 A 4/2009
CN 101418996 A 4/2009
(Continued)

OTHER PUBLICATIONS

Heidmann, James D. et al., "Conjugate Heat Transfer Effects on a Realistic Film-Cooled Turbine Vane," Proceedings of ASME Turbo Expo 2003 GT2003-38553, pp. 1-11 (Year: 2003).*
(Continued)

*Primary Examiner* — Rehana Perveen
*Assistant Examiner* — Steven W Crabb
(74) *Attorney, Agent, or Firm* — Beusse Wolter Sanks & Maire

(57) ABSTRACT

Computer implemented method for prediction of performances of a compressor includes modelling a CFD gas path, modelling vanes and blades as non-adiabatic solids, building a model of the rotor including at least a first rotor solid domain facing a plurality of vanes non-adiabatic solids and at least a second plurality of rotor solid domains attached to a plurality of blades non-adiabatic solids, building a model of the stator including at least a first casing solid domain attached to a plurality of vanes non-adiabatic solids and at least a second casing solid domain facing a plurality of blades non-adiabatic solids, modelling one or more solid rotor interfaces, each solid rotor interface providing an heat exchange link between a respective pair of adjacent rotor solid domains, and modelling one or more solid stator interfaces, each solid rotor interface providing an heat exchange link between a respective pair of adjacent stator solid domains.

13 Claims, 2 Drawing Sheets

(56) References Cited

U.S. PATENT DOCUMENTS

2005/0223708 A1* 10/2005 Kishibe ............... F01K 21/047
60/726
2013/0019477 A1  1/2013 Blais et al.

FOREIGN PATENT DOCUMENTS

| | | |
|---|---|---|
| CN | 101581509 A | 11/2009 |
| WO | 2014072085 A1 | 5/2014 |

OTHER PUBLICATIONS

D. Bohn & K. Kusterer, "Turbulent and conjugate heat transfer simulation for gas turbine application", Institute of Steam and Gas Turbines, Aachen University, pp. 1-67 (Year: 2005).*

Braembussche, et al. "Design of optimization of a multistage turbine for helium cooled reactor," Nuclear Engineering and Design 238 pp. 3136-3144 (Year: 2008).*

International Search Report dated Feb. 1, 2016, for PCT/EP2015/074146.

Schrittwieser, Maximilian et al, "Numerical Analysis of Heat Transfer and Flow of Stator Duct Models", IEEE Transactions on Industry Applications, Sep. 18-20, 2013, vol. 50, No. 1, pp. 226-233, ISSN: 0093-9994, DOI: 10.1109/TIA.2013.226719,XP011537479, Jan./Feb. 2014.

He, L, "Multi-scale Method Development for Turbine Heat Transfer and Aerodynamics". MUSAF II, Toulouse, Rolls-Royce / Royal Academy of Engineering Professor of Computational Aerothermal Engineering, Department of Engineering Science, Oxford University; 2013.

Verstraete, T et al, "A Conjugate Heat Transfer Method Applied to Turbomachinery", European Conference on Computational Fluid Dynamics, ECCOMAS CFD 2006, P. Wesseling, E Oñate, J. Périaux (Eds), © TU Delft, The Netherlands, 2006.

Aghaali, Habib, "On-Engine Turbocharger Performance Considering Heat Transfer" Licentiate thesis, Department of Machine Design Royal Institute of Technology SE-100 44 Stockholm, ISBN 978-91-7501-332-9, May 22, 2012.

Shaaban, Sameh, "Experimental Investigation and Extended Simulation of Turbocharger Non-Adiabatic Performance", Vom Fachbereich Maschinenbau der Universität Hannover zur Erlangung des akademischen Grades Doktor-Ingenieur genehmigte Dissertation, 2004.

* cited by examiner

METHOD FOR THE PREDICTION OF TURBOMACHINE PERFORMANCES

CROSS REFERENCE TO RELATED APPLICATIONS

This application is the US National Stage of International Application No. PCT/EP2015/074146 filed Oct. 19, 2015, and claims the benefit thereof. The International Application claims the benefit of European Application No. EP14191325 filed Oct. 31, 2014. All of the applications are incorporated by reference herein in their entirety.

FIELD OF INVENTION

The present invention relates to a computer implemented method for the prediction of a compressor performance through conjugate heat transfer calculation. The present invention also relates to a method of manufacturing of a compressor including a preliminary computer-implemented step for the prediction of the compressor performance.

ART BACKGROUND

During performance assessment of a typical compressor using CFD ("Computational Fluid Dynamics"), it is known to model the solid surfaces boundaries, such as those of blade, vanes, casing and hub, as adiabatic, the computational domain including only the fluid. However, in reality there is some heat transfer that takes place through the solid surfaces mentioned above. If modelled, such heat transfer can result, other numerical errors remaining same, in a different, usually smaller, average fluid temperature than those predicted by a CFD calculation in which the solid boundaries are modelled as adiabatic. A more accurate and non-adiabatic modelling of solid surfaces can therefore result in higher predicted efficiency and realistic stage matching.

A possible state-of-the-art methodology, by means of which the computational domain is extended to the solid region, is known as Conjugate Heat Transfer (CHT) method. Two implementations of such method, for two turbines respectively, are disclosed in "A Conjugate Heat Transfer Method Applied To Turbomachinery" by T. Verstraete, Z. Alsalihi and R. A. Van den Braembussche of the Von Karman Institute for Fluid Dynamics. The approach described in such document is based on a coupling of two codes: a non-adiabatic Navier-Stokes (NS) solver for the flow in the fluid domain and a Finite Element Analysis (FEA) for the heat conduction in the solid parts of the turbines. Continuity of temperature and heat flux at the common boundaries of the NS and FEA models is obtained by an iterative adjustment of the boundary conditions. The non-coinciding grids at the common boundary, requires an interpolation to pass boundary conditions from one model grid to the other and the need for an iterative procedure to obtain the same temperature and heat flux distribution at the boundaries that are common to the NS and FEA calculation domain.

The method described above allows reaching accurate results for the example proposed, but could be significantly improved, particularly when applied to compressors. The method in fact does not take into account: —the casing and hence the transfer of heat between the casing and the surrounding environment; —a stationary fluid domain on the top of the casing to account for heat transfer between the casing and the surrounding environment; —interfaces between models of adjacent elements having different physical properties, for example adjacent elements of the casing, of the rotor and of the stationary fluid domain on the top of the casing, to account of the differences in their circumferential extent due to the differences in blade or vane numbers of the different rotary or stationary stages, respectively, of the compressor.

SUMMARY OF THE INVENTION

It may be an object of the present invention to provide a computer implemented method for the prediction of a compressor performance, which improves the existing methods of the same type, providing a more realistic modelling of the components of the compressor, thus achieving a more realistic performance prediction.

It may be a further object of the present invention to provide a manufacturing method for a compressor which includes steps of manufacturing rotary and/or stationary components of the compressor based on the results of the computer implemented method cited above.

In order to achieve the objects defined above, a computer implemented method and a manufacturing method according to the independent claim are provided. The dependent claims describe advantageous developments and modifications of the invention.

According to a first aspect of the present invention, it is provided a computer implemented method for the prediction of the performances of a compressor comprising at least a blade stage and at least a vanes stage. The method comprises the steps of: —modelling a CFD gas path including: —a compressor inlet passage, —at least a vane flow portion, at least a blade flow portion adjacent to the vane flow portion and at least a mixing plane, between the vane flow portion and the blade flow portion, and—a compressor outlet passage, —modelling the vanes and blades as non-adiabatic solids, —building a model of the rotor including at least a first rotor solid domain facing a plurality of vanes non-adiabatic solids and at least a second plurality of rotor solid domains attached to a plurality of blades non-adiabatic solids, the first and second rotor solid domains being adjacent to each other and modelled as non-adiabatic, —building a model of the stator including at least a first casing solid domain attached to a plurality of vanes non-adiabatic solids and at least a second casing solid domain facing a plurality of blades non-adiabatic solids, the first and second casing solid domains being adjacent to each other and modelled as non-adiabatic, —modelling a plurality of fluid to solid interfaces, each fluid to solid rotor interface providing an heat exchange link between a respective blade flow portion or vane flow portion and a radially adjacent rotor solid domain or casing solid domain, —modelling one or more solid rotor interfaces, each solid rotor interface providing an heat exchange link between a respective pair of adjacent rotor solid domains, and—modelling one or more solid stator interfaces, each solid stator interface providing an heat exchange link between a respective pair of adjacent stator solid domains.

As already known in the art, models for describing the performances of a compressor takes into account only a circumferential portion of the compressor around its axis of rotation. The circumferential extent of the model is then considered rotational periodic.

Advantageously, in the present invention, the solid rotor and stator interfaces between casing solid domains takes into account the difference in their circumferential extent, due to the difference in blade and vane numbers.

According to a possible embodiment of the present invention, the method further comprises the step of building a stationary fluid model of the air surrounding the casing, the stationary fluid model having a first inner boundary in contact with the casing solid domains and a second external boundary, opposite to the first boundary where atmospheric pressure and temperature conditions are imposed.

Advantageously, the use of a stationary fluid domain on the top of casing accounts for a near natural heat transfer between the system and the surroundings.

According to a possible embodiment of the present invention, the stationary fluid model of the air surrounding the casing comprises a plurality of fluid domains, each being in contact with a respective casing solid domain, one or more fluid interfaces being modelled, each fluid interface providing an heat exchange link between a respective pair of adjacent fluid domains.

Similarly to the solid rotor and stator interfaces, fluid interfaces between stationary fluid domains on top of the casing solids to account for differences in their circumferential extent due to difference in blade and vane numbers.

According to another possible embodiment of the present invention, the method further comprises the steps of:
—modelling a first stationary solid domain downstream the compressor inlet, upstream the compressor rotor and adjacent thereto, —providing an upstream solid rotor interface for providing an heat exchange link between the rotor and the first stationary solid domain, —modelling a plurality of inlet guide vanes as non-adiabatic solids extending radially from the first stationary solid domain to a first casing solid domain, the first stationary solid domain and the first casing solid domain having a respective upstream boundary where atmospheric temperature conditions are imposed.

The first stationary solid domain, adjacent to the rotor, and the first casing solid domain connected to the first stationary solid domain by means of the non-adiabatic solids representing the inlet guide vanes provide for convenient transition from inlet conditions to the portion of the model including the rotor.

According to another possible embodiment of the present invention, the method further comprises the steps of:
—modelling a second stationary solid domain downstream the compressor rotor and adjacent thereto, —providing a downstream solid rotor interface for providing an heat exchange link between the rotor and the second stationary solid domain, —modelling a plurality of outlet vanes as non-adiabatic solids extending radially from the second stationary solid to a final downstream casing solid domain, —modelling a final portion of the compressor outlet passage, extending for a length from the outlet vanes to a downstream boundary where boundary, in particular atmospheric, pressure is imposed.

Advantageously, the length L1 of the final portion of the CFD gas path is chosen such that at the final downstream boundary of the CFD gas path a known value of pressure, in particular atmospheric pressure (when, for example, the compressor is not connected to a downstream turbine), is specified as pressure boundary condition.

According to another possible embodiment of the present invention, the method further comprises the step of imposing the same temperature of the final boundary of the final portion of the CFD gas path to a downstream boundary of the downstream solid rotor interface and to a downstream boundary of the final downstream casing solid domain. Advantageously, this allows imposing the same temperature boundary conditions in all the final downstream boundary of the model.

According to a further aspect of the invention it is provided a method for manufacturing a compressor comprising a compressor inlet, a rotor having a plurality of blade stages and a stator having a plurality of vanes stages, the manufacturing method including a plurality of steps for manufacturing the rotor, the stator, the blades and the vanes, the dimensions and shapes of the compressor inlet, rotor, the stator, the blades and the vanes being defined as results of a computer implemented method according to one or more of the preceding claims.

BRIEF DESCRIPTION OF THE DRAWINGS

The aspects defined above and further aspects of the present invention are apparent from the examples of embodiment to be described hereinafter and are explained with reference to the examples of the embodiment. The invention will be described in more detail hereinafter with reference to examples of embodiment but to which the invention is not limited.

DETAILED DESCRIPTION

Figure 1:
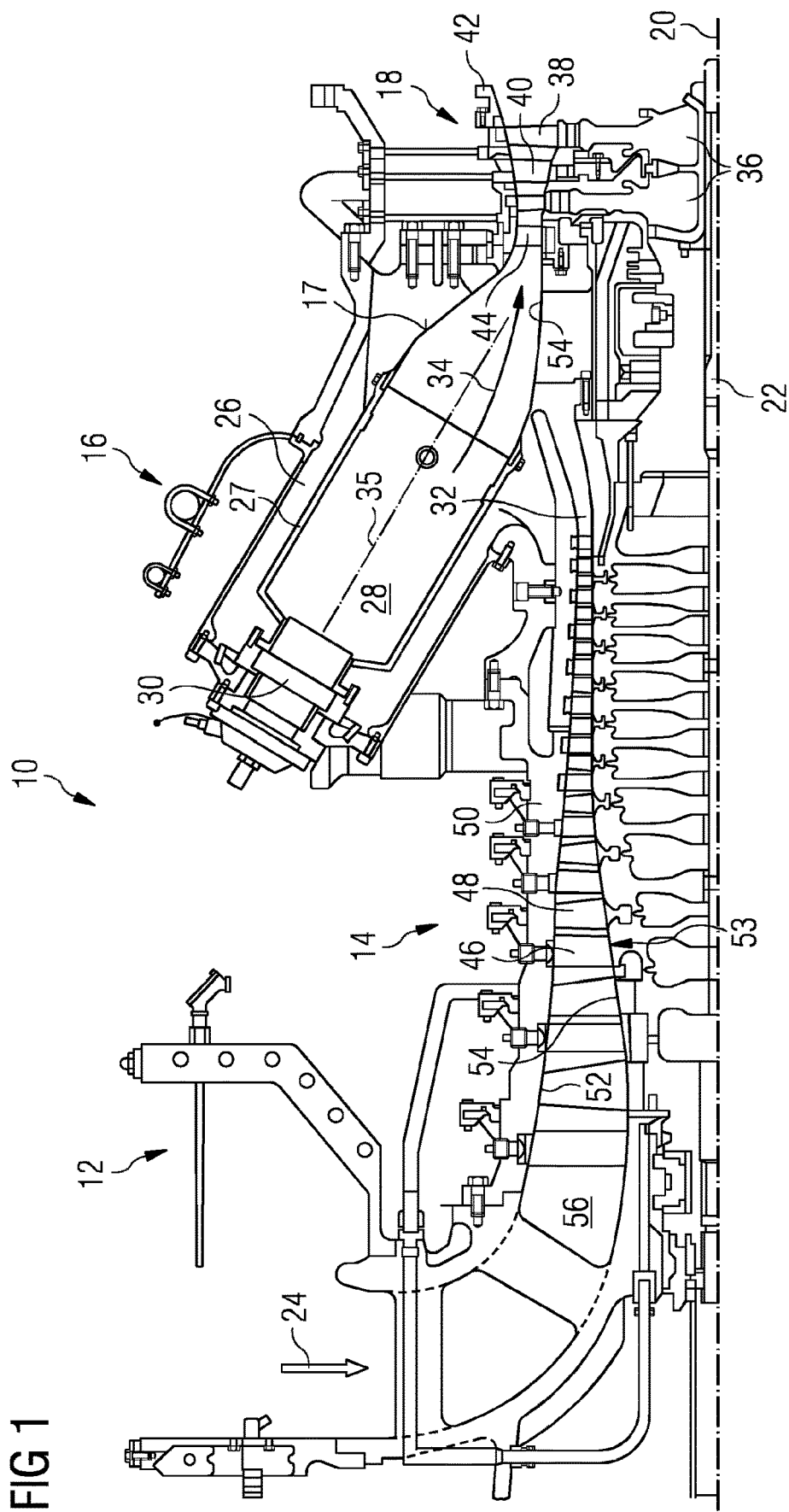
FIG. 1 is a longitudinal sectional view of a gas turbine engine including a compressor, whose performance may be predicted with the method of the present invention.

FIG. 1 shows an example of a gas turbine engine 10 in a sectional view. The gas turbine engine 10 comprises, in flow series, an air inlet 12, a compressor section 14, a combustor section 16 and a turbine section 18 which are generally arranged in flow series and generally about and in the direction of a longitudinal or rotational axis 20. The gas turbine engine 10 further comprises a shaft 22 which is rotatable about the rotational axis 20 and which extends longitudinally through the gas turbine engine 10. The shaft 22 drivingly connects the turbine section 18 to the compressor section 14.

In operation of the gas turbine engine 10, air 24, which is taken in through the air inlet 12 is compressed by the compressor section 14 and delivered to the combustion section or burner section 16. The burner section 16 comprises a burner plenum 26, one or more combustion chambers 28 and at least one burner 30 fixed to each combustion chamber 28. The combustion chambers 28 and the burners 30 are located inside the burner plenum 26. The compressed air passing through the compressor 14 enters a diffuser 32 and is discharged from the diffuser 32 into the burner plenum 26 from where a portion of the air enters the burner 30 and is mixed with a gaseous or liquid fuel. The air/fuel mixture is then burned and the combustion gas 34 or working gas from the combustion is channeled through the combustion chamber 28 to the turbine section 18 via a transition duct 17.

The turbine section 18 comprises a number of blade carrying discs 36 attached to the shaft 22. In the present example, two discs 36 each carry an annular array of turbine blades 38. However, the number of blade carrying discs could be different, i.e. only one disc or more than two discs. In addition, guiding vanes 40, which are fixed to a stator 42 of the gas turbine engine 10, are disposed between the stages of annular arrays of turbine blades 38. Between the exit of the combustion chamber 28 and the leading turbine blades 38 inlet guiding vanes 44 are provided and turn the flow of working gas onto the turbine blades 38.

The combustion gas from the combustion chamber 28 enters the turbine section 18 and drives the turbine blades 38 which in turn rotate the shaft 22. The guiding vanes 40, 44 serve to optimise the angle of the combustion or working gas on the turbine blades 38.

The turbine section 18 drives the compressor section 14. The compressor section 14 comprises an axial series of vane stages 46 and rotor blade stages 48. The rotor blade stages 48 comprise a rotor disc supporting an annular array of blades. The compressor section 14 also comprises a casing 50 that surrounds the rotor stages and supports the vane stages 48. The guide vane stages include an annular array of radially extending vanes that are mounted to the casing 50. The vanes are provided to present gas flow at an optimal angle for the blades at a given engine operational point. Some of the guide vane stages have variable vanes, where the angle of the vanes, about their own longitudinal axis, can be adjusted for angle according to air flow characteristics that can occur at different engine operations conditions.

The casing 50 defines a radially outer surface 52 of the inlet passage 56 of the compressor 14. A radially inner surface 54 of the inlet passage 56 is at least partly defined by a rotor drum 53 of the rotor which is partly defined by the annular array of blades 48.

The present invention is described with reference to the above exemplary turbine engine having a single shaft or spool connecting a single, multi-stage compressor and a single, one or more stage turbine. However, it should be appreciated that the present invention is equally applicable to two or three shaft engines and which can be used for industrial, aero or marine applications.

The terms upstream and downstream refer to the flow direction of the airflow and/or working gas flow through the engine unless otherwise stated. The terms upstream and downstream refer to the general flow of gas through the engine. The terms axial, radial and circumferential are made with reference to the rotational axis 20 of the engine.

Figure 2:
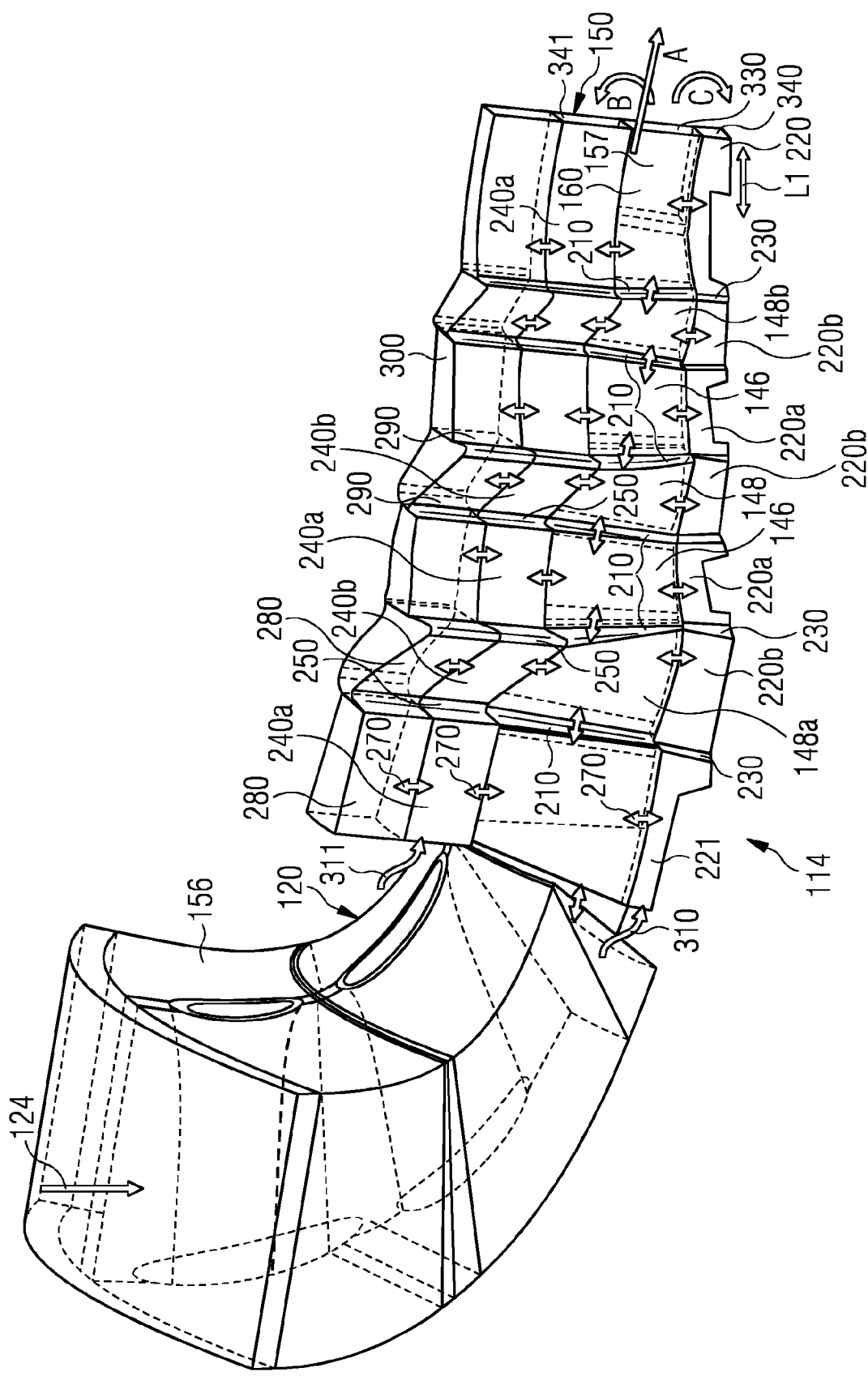
FIG. 2 shows a model of the compressor in FIG. 1.

FIG. 2 shows an example of a model 114 of the compressor section 14 according to the method of the present invention.

In general, according to the present invention any compressor may be modelled, in particular a compressor not coupled with a turbine.

Models of compressor according to the present invention take into account only a circumferential portion of the compressor around its axis of rotation. The circumferential extent of the model is considered rotational periodic.

The multistage model 114 created by steps of the method of the present invention comprises a CFD gas path 120 including: —a compressor inlet passage 156, comprising an upstream boundary 124 where atmospheric pressure and temperature conditions are imposed, —a compressor outlet passage 157. —a plurality of blade flow portions 148, each for each stage of the compressor 14, including a first blade flow portion 148a adjacent to the compressor inlet passage 156 and a last blade flow portion 148b, adjacent to a compressor outlet passage 157, —at least a vane flow portion 146, each vane flow portion 146 being comprised between two consecutive blade flow portion 148, 148a, 148b, —a plurality of mixing planes 210, between each pair of adjacent vane flow portion 146 and blade flow portion 148, 148a, 148b.

All the vanes and the blades along the gas path 120 are modelled as non-adiabatic solids, according to the Conjugate Heat Transfer (CHT) methodology.

The Computational Fluid Dynamics gas path 120 is the modelled gas or air washed surfaces of the compressor components.

The model of the rotor includes a plurality of rotor solid domains in series including a first portion of rotor solid domains 220a facing the plurality of vanes non-adiabatic solids and a second portion of rotor solid domains 220b attached to the plurality of blades non-adiabatic solids. The rotor solid domains 220a, 220b are modelled as non-adiabatic.

Between pairs of adjacent solid domains interfaces are provided.

The interface treatment of this invention is the so called 'Frozen Rotor' (FR) approach, in which during the information exchange between two domains of different physical properties, the relative position of the domain on either side is taken to be frozen. If the frame of reference changes, as in the case of exchange between rotating and stationary domains, then appropriate fluxes are transformed. If only the circumferential extent changes as in the case of exchange between two stationary fluid domains on top of casing, then fluxes are scaled by a pitch ratio.

Between each pair of adjacent rotor solid domains 220a, 220b a solid rotor interfaces (FR) 230 is provided. Each solid rotor interface 230 provides an heat exchange link between the respective pair of adjacent rotor solid domains 220a, 220b.

The model of the stator 150 includes a plurality of casing solid domains 240a, 240b including a first portion of casing solid domains 240a attached to the plurality of vanes non-adiabatic solids and a portion of casing solid domains 240b facing a plurality of the blades non-adiabatic solids. The stator solid domains 240a, 240b are modelled as non-adiabatic.

Between each pair of adjacent stator solid domains 240a, 240b a solid stator interfaces 250 is provided. Each solid stator interface (FR) 250 provides a heat exchange link between the respective pair of adjacent stator solid domains 240a, 240b.

A plurality of fluid to solid interfaces 270 are modelled for providing an heat exchange link between a respective blade flow portion or vane flow portion and the respective radially adjacent rotor solid domain 220a, 220b and casing solid domain 240a, 240b.

The multistage model 114 further comprises a stationary fluid model of the air surrounding the casing, the stationary fluid model having a first inner boundary in contact with each of the casing solid domains 240a, 240b and a second external boundary 300, opposite to the first boundary, where atmospheric pressure and temperature conditions are imposed.

The stationary fluid model of the air surrounding the casing comprises a plurality of fluid domains 280, each being in contact with a respective casing solid domain 240a, 240b. A plurality of fluid interfaces (FR) 290 is modelled for providing an heat exchange link between a respective pair of adjacent fluid domains 280.

Upstream the rotor and downstream the compressor inlet passage 156, the model 114 comprises: —a first upstream stationary solid domain 221 connected to the first upstream rotor solid domains 220b by means of an upstream solid rotor interface 230, —a plurality of inlet guide vanes modelled as non-adiabatic solids and extending radially from the upstream stationary solid domain 221 to the first upstream casing solid domain 240a.

The first stationary solid domain 221 and the first casing solid domain 240a have a respective upstream boundary 310, 311 where atmospheric temperature conditions are imposed.

Downstream the rotor and downstream the compressor inlet passage 156, the model 114 comprises: —a second stationary solid domain 220 downstream the compressor rotor and adjacent to it. A downstream solid rotor interface 230 is used for providing an heat exchange link between the rotor and the second stationary solid domain 220, —a plurality of outlet vanes modelled as non-adiabatic solids and extending radially from the second stationary solid 220 to a final downstream casing solid domain 240*a*, —a final portion 160 of the compressor outlet passage 157, extending for a length L1 from the outlet vanes to a downstream boundary 330 where boundary pressure is imposed.

L1 is chosen in order that on the downstream boundary 330 a known pressure can be imposed, in particular atmospheric pressure.

The second stationary solid domain 220 and the final downstream casing solid domain 240*a* have a respective downstream boundary 340, 341 where the same temperature of the final downstream boundary 330 is imposed.

According to the computer implemented method of the present invention, model 114 is then solved by using two codes: a non-adiabatic Navier-Stokes (NS) solver for the flow in the fluid domains and a Finite Element Analysis (FEA) for the heat conduction in the solid domains. Continuity of temperature and heat flux at the common boundaries is obtained by an iterative adjustment of the boundary conditions between fluids and solids. As described above external boundary conditions are: —atmospheric pressure and temperature at the upstream boundary 124 and at the second external boundary 300 of the stationary fluid domains 280, —atmospheric temperature conditions at the upstream boundaries 310, 311, —known (atmospheric) pressure conditions at the final downstream boundary 330.

At each iteration, the same temperature of the final downstream boundary 330 is imposed to the downstream boundaries 340, 341 of second stationary solid domain 220 and of the casing.

Convergence is obtained normally with a number of iteration comprised between 500 and 600.

Accuracy of the model of the present invention assures a good agreement between calculated results and experimental tests is obtainable. The computer implemented method described above can therefore conveniently be used in a more general process of designing and manufacturing of a compressor.

The invention claimed is:

1. A computer implemented method for the prediction of the performances of a compressor using a multistage model, the compressor comprising a rotor having a blade stage comprising blades, a stator having a vanes stage comprising vanes, and a casing surrounding the rotor and supporting the vanes, the method comprising:
    modelling a Computational Fluid Dynamics CFD gas path including:
        a compressor inlet passage,
        a vane flow portion, a blade flow portion adjacent to the vane flow portion and a mixing plane, between the vane flow portion and the blade flow portion, and
        a compressor outlet passage,
    modelling the vanes and the blades as non-adiabatic solids,
    building a model of the rotor including at least a first rotor solid domain facing a plurality of vanes as non-adiabatic solids and at least a second plurality of rotor solid domains attached to a plurality of blades as non-adiabatic solids, the first and second rotor solid domains being adjacent to each other and modelled as non-adiabatic,
    building a model of the stator including the casing wherein the model includes at least a first casing solid domain attached to a plurality of vanes as non-adiabatic solids and at least a second casing solid domain facing a plurality of blades as non-adiabatic solids, the first and second casing solid domains being adjacent to each other and modelled as non-adiabatic,
    modelling a plurality of fluid to solid interfaces, each fluid to solid rotor interface providing a heat exchange link between a respective blade flow portion or vane flow portion and a radially adjacent rotor solid domain or casing solid domain,
    modelling one or more solid rotor interfaces, each solid rotor interface providing a heat exchange link between a respective pair of adjacent rotor solid domains,
    modelling one or more solid stator interfaces, each solid stator interface providing a heat exchange link between a respective pair of adjacent stator solid domains; and
    solving the multistage model.

2. The computer implemented method according to claim 1, further comprising:
    building a stationary fluid model of the air surrounding the casing to account for heat transfer between the casing and the surrounding environment, the stationary fluid model having a first inner boundary in contact with the casing solid domains and a second external boundary, opposite to the first boundary where atmospheric pressure and temperature conditions are imposed as boundary conditions when solving the multistage model.

3. The computer implemented method according to claim 2,
    wherein the stationary fluid model of the air surrounding the casing comprises a plurality of fluid domains, each being in contact with a respective casing solid domain, one or more fluid interfaces being modelled, each fluid interface providing a heat exchange link between a respective pair of adjacent fluid domains.

4. The computer implemented method according to claim 1, further comprising:
    modelling a first stationary solid domain downstream of the compressor inlet passage, upstream of the rotor and adjacent thereto,
    providing an upstream solid rotor interface for providing a heat exchange link between the rotor and the first stationary solid domain,
    modelling a plurality of inlet guide vanes as non-adiabatic solids extending radially from the first stationary solid domain to the first casing solid domain,
    wherein the first stationary solid domain and the first casing solid domain have a respective upstream boundary where atmospheric temperature conditions are imposed as boundary conditions when solving the multistage model.

5. The computer implemented method according to claim 1, further comprising:
    modelling a second stationary solid domain downstream of the rotor and adjacent thereto,
    providing a downstream solid rotor interface for providing a heat exchange link between the rotor and the second stationary solid domain,
    modelling a plurality of outlet vanes as non-adiabatic solids extending radially from the second stationary solid to a final downstream casing solid domain, and
    modelling a final portion of the compressor outlet passage, extending for a length from the outlet vanes to a downstream boundary where boundary pressure is imposed as boundary conditions when solving the multistage model.

6. The computer implemented method according to claim 5, further comprising:

imposing the same temperature of the final boundary of the final portion of the CFD gas path to a downstream boundary of the downstream solid rotor interface and to a downstream boundary of the final downstream casing solid domain as boundary conditions when solving the multistage model.

7. The computer implemented method according to claim 1,
wherein circumferential extent of all solid domains is rotational periodic.

8. The computer implemented method according to claim 1,
wherein the compressor inlet passage of the CFD gas path comprises an upstream boundary where atmospheric pressure and temperature conditions are imposed as boundary conditions when solving the multistage model.

9. The computer implemented method according to claim 1,
wherein the multistage model is solved by using a non-adiabatic Navier-Stokes (NS) solver for the flow in the fluid domains and a Finite Element Analysis (FEA) for the heat conduction in the solid domains.

10. The computer implemented method according to claim 9,
wherein continuity of temperature and heat flux at common boundaries is obtained by an iterative adjustment of the boundary conditions between fluids and solids.

11. A computer implemented method for the prediction of the performances of a compressor using a multistage model, the compressor comprising a rotor having a blade stage, a stator having a vanes stage, and a casing surrounding the rotor and supporting the vane stage, the method comprising:
modelling a Computational Fluid Dynamics gas path including:
a compressor inlet passage comprises upstream boundary where atmospheric pressure and temperature conditions are imposed,
at least a vane flow portion, at least a blade flow portion adjacent to the vane flow portion and at least a mixing plane, between the vane flow portion and the blade flow portion, and
a compressor outlet passage,
modelling the vanes and blades as non-adiabatic solids,
building a model of the rotor including at least a first rotor solid domain facing a plurality of vanes as non-adiabatic solids and at least a second plurality of rotor solid domains attached to a plurality of blades as non-adiabatic solids, the first and second rotor solid domains being adjacent to each other and modelled as non-adiabatic,
building a model of the stator including the casing wherein the model includes at least a first casing solid domain attached to a plurality of vanes as non-adiabatic solids and at least a second casing solid domain facing a plurality of blades as non-adiabatic solids, the first and second casing solid domains being adjacent to each other and modelled as non-adiabatic,
modelling a plurality of fluid to solid interfaces, each fluid to solid rotor interface providing a heat exchange link between a respective blade flow portion or vane flow portion and a radially adjacent rotor solid domain or casing solid domain,
modelling one or more solid rotor interfaces, each solid rotor interface providing a heat exchange link between a respective pair of adjacent rotor solid domains, and
modelling one or more solid stator interfaces, each solid rotor interface providing a heat exchange link between a respective pair of adjacent stator solid domains,
building a stationary fluid model of the air surrounding the casing where atmospheric pressure and temperature conditions are imposed as boundary conditions when solving the multistage model,
modelling of fluid interfaces for providing a heat exchange link between pairs of adjacent fluid domains, and
solving the multistage model.

12. The computer implemented method according to claim 10,
wherein the multistage model is solved by using a non-adiabatic Navier-Stokes (NS) solver for the flow in the fluid domains and a Finite Element Analysis (FEA) for the heat conduction in the solid domains.

13. The computer implemented method according to claim 12,
wherein continuity of temperature and heat flux at common boundaries is obtained by an iterative adjustment of the boundary conditions between fluids and solids.

* * * * *